T. FAWCUS.
GEAR CUTTING MACHINE.
APPLICATION FILED MAY 11, 1912.
1,067,013.
Patented July 8, 1913.
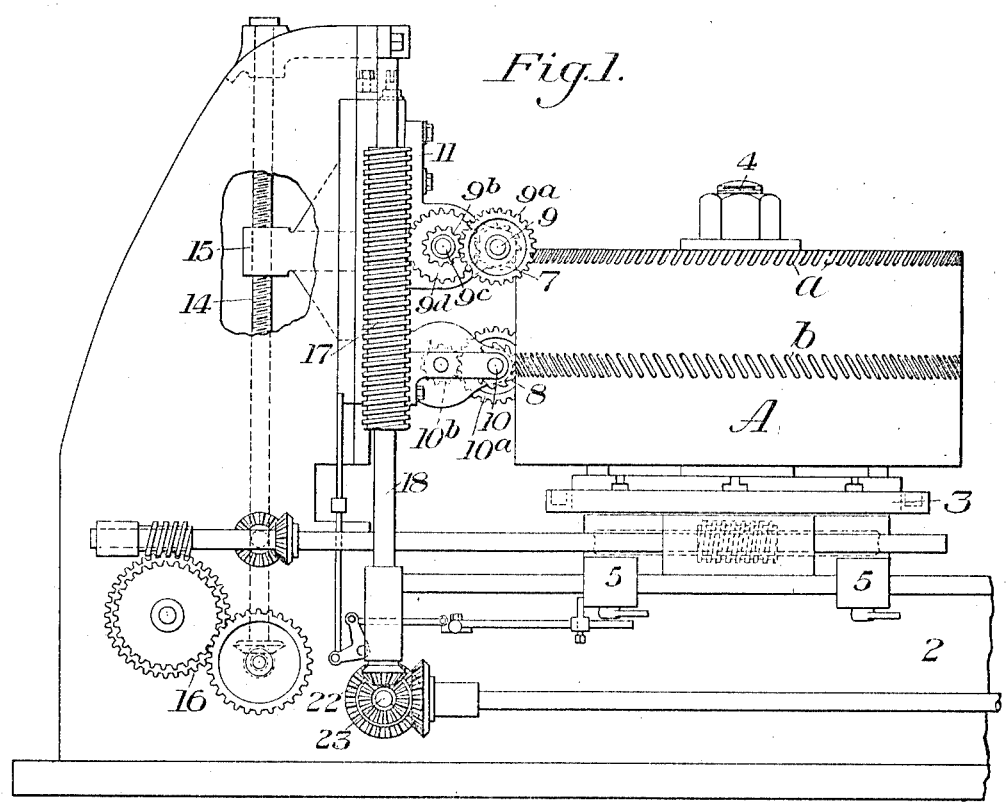
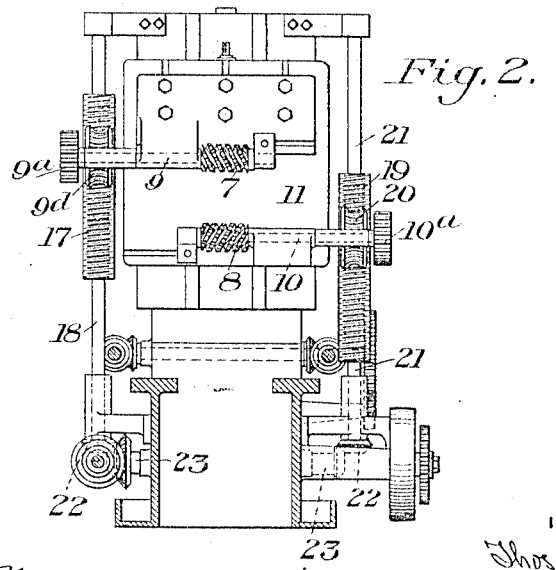
WITNESSES
R. H. Balderson
W. Famariss
INVENTOR
Thos. Fawcus,
by Bakewell, Byrnes Parmelee
Attys

UNITED STATES PATENT OFFICE.

THOMAS FAWCUS, OF PITTSBURGH, PENNSYLVANIA.

GEAR-CUTTING MACHINE.

1,067,013.  Specification of Letters Patent.  Patented July 8, 1913.

Application filed May 11, 1912. Serial No. 696,762.

*To all whom it may concern:*

Be it known that I, THOMAS FAWCUS, a resident of Pittsburgh, Allegheny county, Pennsylvania, have invented a new and useful Improvement in Gear-Cutting Machines, of which the following is a full, clear, and exact description, reference being had to the accompanying drawings, forming part of this specification, in which—

Figure 1 is a side elevation of a part of a gear cutting machine embodying my invention, with a portion of the frame broken away; and Fig. 2 is a view partly in vertical section and partly in front elevation.

The present invention has relation to machines for cutting double helical gear wheels, and has been more especially designed as an improvement upon the machine described and claimed in my Patent No. 1,022,667, of April 9th, 1912.

The improvement has more particular relation to the provision of means of novel and efficient character for varying the speed of the cutters relatively to that of the blank in order to produce teeth of the proper angle and pitch.

Referring to the accompanying drawings, the numeral 2 designates a portion of the frame of the machine shown in my said patent; 3 is the rotary blank supporting table mounted to rotate in a horizontal plane upon the vertical shaft 4, and which is mounted in the carriage 5 movable longitudinally on the bed of the machine.

A designates a partially cut blank, which is shown as rigidly secured to the table 3 in any suitable manner, and which is to have double helical teeth cut thereon. I have indicated at $a$ and $b$ the beginnings of the two sets of teeth. The teeth $a$, extending from the upper edge of the blank to the center line of the periphery, are cut by a rotary hob 7, while the teeth $b$ which extend from the lower edge of the blank to the center, are cut by the hob 8. These hobs have helical cutting teeth, which mesh with the teeth which they cut in the blank, one of the hobs being right-hand and the other left-hand. The hob 7 is mounted upon a transverse shaft 9; while the hob 8 is mounted on a transverse shaft 10, these two shafts being mounted one above another in suitable bearings on a vertically movable slide or carrier 11.

The slide or carrier 11 is given its feed movement by the vertical feed screw 14, which engages the nut portion 15 of the slide or carriage, and which is driven by gearing 16 which may be of any suitable character such as that shown in my said patent.

The hob shaft 9 has at one end a gear wheel $9^a$, which is engaged and driven by a pinion $9^b$ on an intermediate shaft $9^c$, which has a worm wheel $9^d$. This worm wheel $9^d$ is engaged and driven by a worm 17 on a vertical shaft 18 at one side of the machine. The hob shaft 10 is driven through similar wheels $10^a$ and $10^b$, and the worm gears 19 and 20, the former being on a vertical shaft 21 at the opposite side of the machine. Each of the shafts 18 and 21 carries a bevel gear wheel 22 at its lower end, which engages a corresponding bevel gear on a transverse driving shaft 23. The shaft 23 drives the two shafts 18 and 21 in opposite directions, so that the two hobs are driven in opposite directions.

The operation is as follows:—The blank having been secured in place on the table 3, and the hobs 7 and 8 adjusted to a distance apart suitable to the width of face of the gear to be cut, the machine is set in motion and the hobs and blank caused to revolve at their relative speeds, *i. e.*, at the precise ratio which the number of threads in each hob bears to the number of teeth to be cut in the blank. The blank is now fed forwardly into cutting relation with the hobs, in the manner described in my said patent, and this feed movement is allowed to proceed until the required depth of cut is reached. The upper hob 7 is set to cut at the upper edge of the blank, and the hob 8 to cut approximately at the peripheral center of the blank. When the blank has been fed and the cutting operation has progressed until the required depth of cut is reached, the vertical feed is set in operation to actuate the feed screw 14. By the use of suitable change gears in the gearing for operating the feed screw 14, as in my said patent, both the rate of speed of the feed screw 14 and also the time relation between the feed screw and the speed of the worm wheels 17 and 19 may be varied. As the feed screw actuates the slide 11, it will be apparent that the worm wheels $9^d$ and 20 will move vertically with respect to the worms 17 and 19, whereby the speed of one of the worm wheels will be slightly increased relatively to the speed of the rotating blank, while the other worm wheel will have its effective speed correspondingly reduced. This change in the relative speed of the two worm wheels effects, of course, a corresponding change in the speeds of the two hobs or cutters relatively to the blank, and the result is to cause the cutters to form teeth at the proper angle and pitch. If the two hobs were both rotated at the speed which would be imparted to them if they were rotated by the blank, the teeth formed would be parallel to the axis of the blank. By rotating one hob relatively faster and the other one relatively slower than the speed which would be imparted to them if driven by such parallel toothed blank, the reverse directions of the two parts of the teeth are produced. Inasmuch as the angle and pitch of the teeth also vary for different gears, necessitating the use of hobs of different diameters, angles and pitches, provision is made for driving the shafts 18 and 21 at different speeds by the use of suitable change gears. There is a definite relation between the diameter of the worm wheels $9^d$ and 20 and the diameter of the hob, so that if the hob shaft were geared positively to the vertical shafts, it would be necessary to have a different set of worm gears for every pitch. This is obviated by making the gears $9^a$, $9^b$ and $10^a$ and $10^b$ change gears, whereby the relation between the speeds of the worm wheels and the hobs may be varied as the pitches vary.

The advantages of my invention result from the simplicity of the means employed for varying the relative speeds of rotation of the two hobs, whereby I am enabled to eliminate the use of differential gear trains with the various change gears connected therewith, and provide a positive method of speed differentiation which can not operate without the feed, and can not fail to operate with the feed. There is such a small amount of movement that there is practically no loss of motion through wear. Consequently, there is little opportunity for errors and the work can be accurately done.

Instead of driving the two shafts 18 and 21 in opposite directions, they may, of course, be driven in the same direction, and their respective worms may be of opposite hand. It will also be understood that spiral gears may be used instead of worm gears, and the term worm gears is used to include spiral gears.

What I claim is:—

1. In a machine for forming double helical gears, two rotary cutters, means for feeding said cutters in the same direction, and means for driving the cutters at relatively different speeds, said means comprising worm gearing, one member of the gearing being movable axially of the other by the action of the feeding means, and the other member being stationary with respect to axial movement; substantially as described.

2. In a machine for forming helical gears, two rotary cutters, means for feeding said cutters in the same direction, and means for rotating the cutters at relatively different speeds, said means comprising worm gears, one member of each set of gears being movable with the cutters in their feeding movements, and the other member being relatively fixed, whereby as the cutters are actuated by the feeding means, one member of each of said worm gears will roll in the teeth of the other member; substantially as described.

3. In a machine for cutting helical gears, a rotary hob, and driving means therefor, said means comprising a shaft having a long worm fixed thereon, and a worm wheel meshing with the worm and geared to the hob, said worm wheel being mounted on the slide which carries the hob, together with means for feeding said slide; substantially as described.

4. In a machine for cutting helical gears, a rotary hob, driving means therefor comprising a shaft having a worm thereon, a feed slide in which the hob is mounted, a worm wheel also mounted on said slide and engaging the worm, the worm wheel having a bodily movement longitudinally of the worm, gearing connecting the worm wheel with the hob shaft, said gearing having a changeable element, and feeding mechanism connected to the feed slide; substantially as described.

5. In a machine for cutting helical gears, a rotary cutter, feeding means therefor, and driving means therefor, said driving means comprising a worm gear, one member of said gear being movable longitudinally along the other member, and means for moving said gear member coincidently with the feed movement of the cutter; substantially as described.

6. In a machine for cutting helical gears, a rotary cutter, feeding and driving means therefor; the driving means comprising a worm and a worm wheel, the worm wheel being movable axially of the worm, the cutter feeding means also forming means for moving the worm wheel; substantially as described.

7. In a machine for forming double helical gears, two rotary cutters, means for feeding said cutters in the same direction, and means for driving the cutters at relatively different speeds, said means comprising worm gearing, one member of the gearing being movable axially of the other by the action of the feeding means, and the other member being stationary with respect to axial movement, the driving members of the worm gearing turning the driven members in opposite directions, and change gears connecting the driven members with the cutters; substantially as described.

In testimony whereof, I have hereunto set my hand.

THOMAS FAWCUS.

Witnesses:
 GEO. B. BLEMING,
 H. M. CORWIN.